Patented Mar. 22, 1949

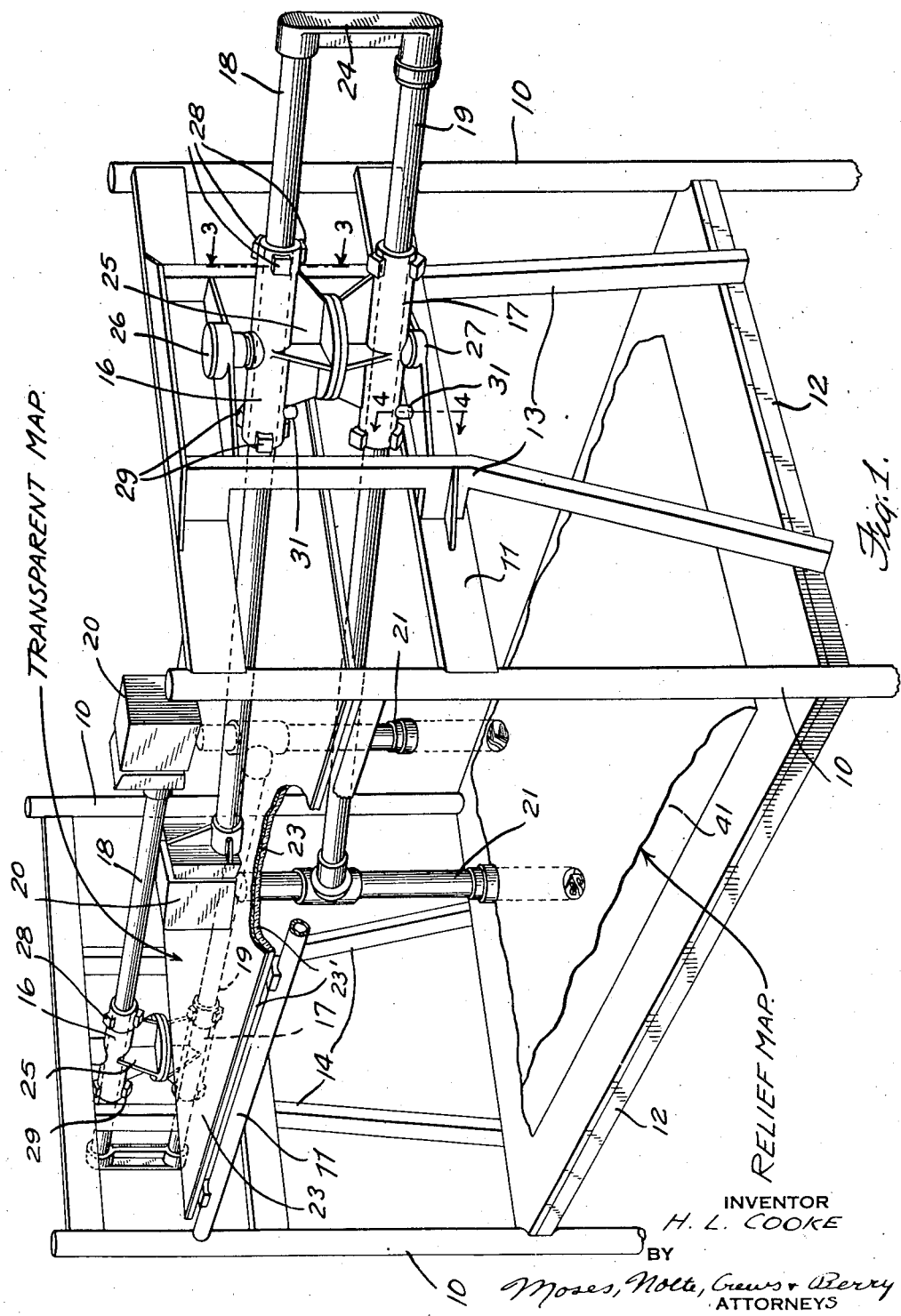

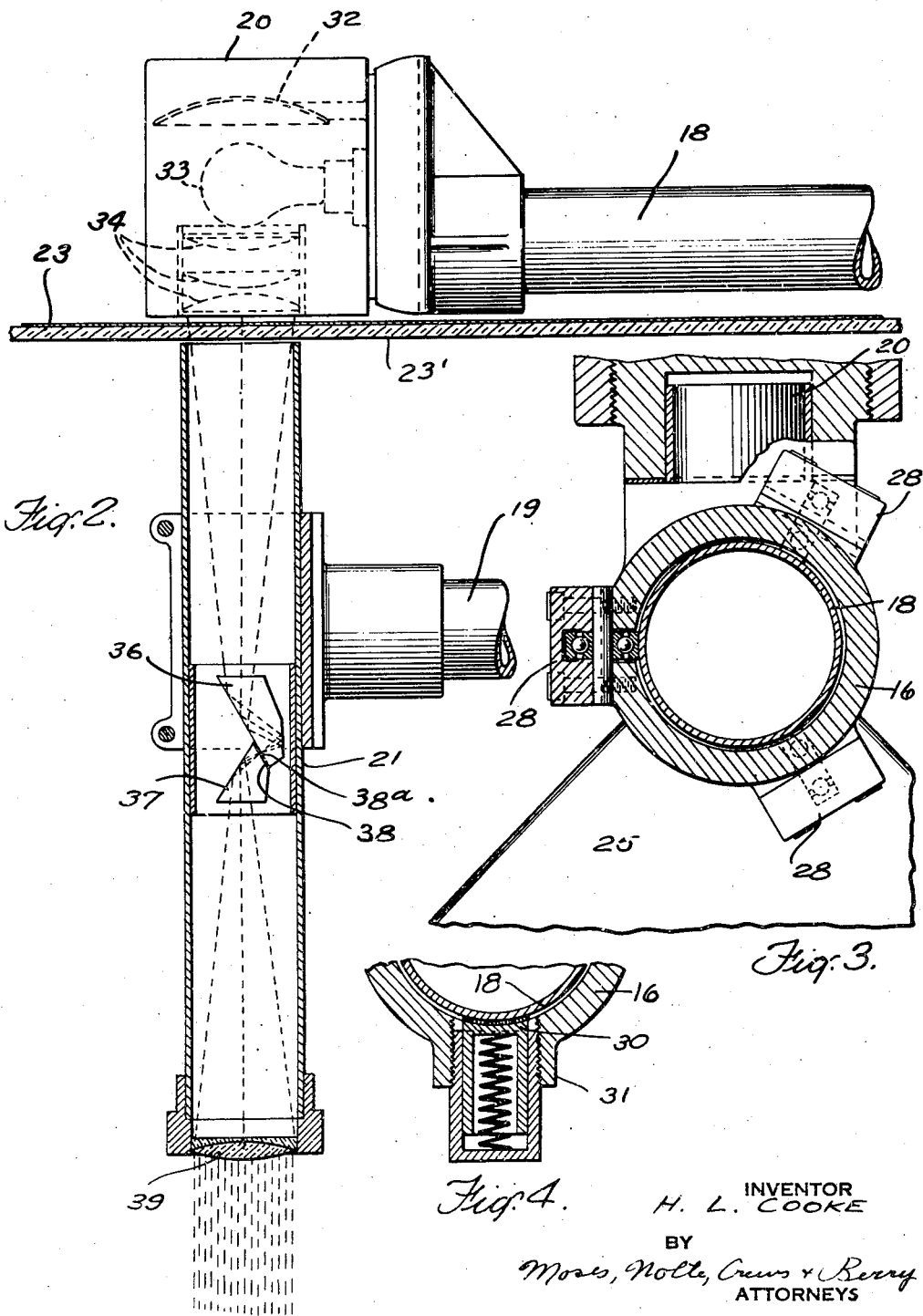

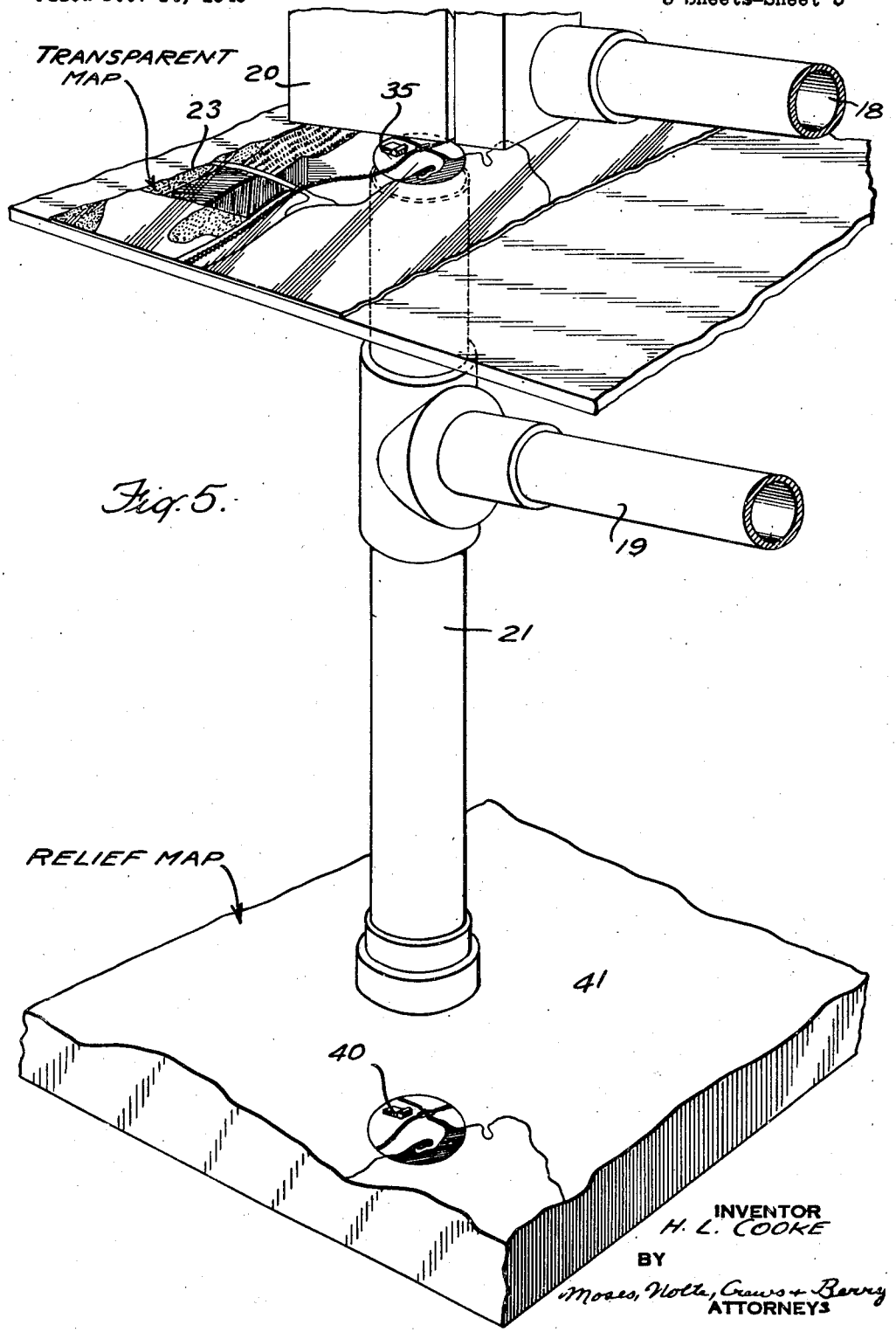

2,464,795

UNITED STATES PATENT OFFICE 2,464,795

TOPOGRAPHICAL MAP PROJECTING APPARATUS

Hereward Lester Cooke, Princeton, N. J., assignor, by mesne assignments, to H. Lester Cooke, Jr., Priscilla Cooke Stewart, and Russell Prickett, as trustees Application December 14, 1945, Serial No. 635,031

5 Claims. (Cl. 88—24)

This invention relates to apparatus suitable for use wherever it is desired to project details of a plane figure upon an uneven surface without dislocation of the details; thus, it is adapted to indicate the exact position for machining operations upon irregularly shaped castings or other metal parts by projecting upon those parts visual images of a full scale translucent drawing of the machined part.

The invention finds particular utility, however, as apparatus for depicting topographical details of small sections of the earth's surface upon relief models thereof, so as to produce an approximate facsimile of the terrain on a reduced scale, one which will be useful, particularly, for military purposes. The invention will therefore be described with especial reference to this latter use, which will be illustrative, of course, of its more general application.

Various ways are known of making relief models of terrain from maps or photographs thereof; but in order to complete such relief models and make them available for use it is necessary to reproduce the topographical details of the terrain on the surface of the relief model. It is important in making an accurate topographical relief model to have the natural features shown on the surface register accurately with the depicted details of the relief, so as to have such features placed in their exact map positions, so that the relief model will be planimetrically as well as topographically correct.

Difficulty has been experienced in accurately locating the surface details of terrain, such as positions of houses, road intersections, etc., on the relief surface, one reason being that it has not been possible to project the map or photograph on the relief model by the use or ordinary projection apparatus, and produce proper registration between the details projected and the surface of the relief. This is so because the elements of the relief surface are at different elevations, which prevents exact registration between all of the details of the model and the details of a flat map projected thereon in conical projection. Owing to this difference in elevation of the elements of the model, the map position of points of high elevation are displaced towards the axis of projection, and map positions of points of low elevation are displaced away from the axis. This results in a general distortion of projection which prevents the proper location of surface details of the terrain by means of such projection.

In accordance with the present invention means are provided for orthographically projecting the representations of the different details to be located on the relief by means of parallel rays, so that exact locations can be plotted on the surface of the relief irrespective of the elevation of the elements of such surface.

In the accompanying drawings which form a part of this specification:

Figure 1 is a diagrammatic perspective view of one form of the apparatus of the invention, with one portion broken away to show details of construction;

Figure 2 is a longitudinal sectional view through one of the two optical projection units illustrated in Fig. 1, showing the paths of light beams through the unit and the prisms mounted therein;

Figure 3 is vertical sectional view on line 3—3 of Fig. 1 looking in the direction of the arrows;

Figure 4 is a fragmentary sectional view on line 4—4 of Fig. 1, looking in the direction of the arrows;

Figure 5 is a fragmentary perspective view on an enlarged scale of the transparent and relief maps and of the projection unit, showing the manner in which a portion of the topography of the transparent map is optically projected on the surface of the relief map.

Figure 1 shows the entire device with the transparent and relief maps in their proper relative positions. The apparatus comprises a frame with upright posts 10 at each corner connected by upper and lower cross-pieces 11 and 12. Auxiliary frames 13 and 14 at the ends of the main frame each support pivoted runways 16 and 17 in which upper and lower bars 18 and 19 are slidably mounted. The bars are preferably made tubular for strength and lightness. Each pair of bars carries on its inner ends an optical projection unit which, as seen more clearly in Fig. 2, comprises two portions 20 and 21 in alignment but not in physical contact with one another, since they straddle the cross-pieces 11 and the translucent map 23 supported on glass plate 23'.

Two complete projection units 20, 21 and supporting bars 18 and 19 are shown in the apparatus of Fig. 1, but only to permit of simultaneous use of the apparatus by two operators; one operator and one set of unit and bars would suffice. Each projection unit is freely movable to any position within the main frame, so long as interference between the two units is avoided. The two bars 18 and 19 supporting each unit are united at their outer ends by a casting 24 so that they slide in unison in runways 16 and 17, the internal construction of which is shown in Fig. 3.

As seen in Figs. 1 and 3, runways 16 and 17 are upper and lower portions of a swinging turntable 25 which is pivoted at 26 and 27 above and below the turntable so that it can swing freely to the right or left in a limited arc traversing the width of the transparent and relief maps. Support bars 18 and 19 travel inwardly or outwardly on ball-bearings 28 and 29 mounted three at each end of runways 16 and 17 as is seen in Fig. 1. The outer races of the ball-bearings contact the exteriors of bars 18 and 19 and revolve on the balls of the bearings as the tubes move, so as to facilitate easy and smooth movement of the bars. A braking arrangement 30 actuated by a spring, shown in Fig. 4, is mounted on each runway at the point 31 to hold the support bars and the projectors in fixed positions selected by the operators. It will be noted that the pivoted and ball-bearing supports of the bars 18 and 19 and projection units 20 and 21 make them freely movable to any portion of the maps under slight impulses by the operators.

The projection unit comprises an enclosure or box 20 mounted on support bar 18 above the translucent map 23, which box houses a reflector 32, a light source, such as the incandescent bulb 33, and condensing lenses 34 which together illuminate a circular limited portion such as 35 of the transparent map 23 as illustrated in Fig. 5. Box 20 and its enclosures move freely above map 23 without contact therewith. Immediately below the glass plate supporting map 23 a tube 21 in alignment with the axis of the light rays from box 20 is supported by bar 19 and moves in maintained aligned relationship with box 20 because of the fixed inter-relationship of support bars 18 and 19.

Projection tube 21 houses a pair of Brashear-Hastings or Hensoldt rectifying prisms 36 and 37 with a plate 38 between them in which a small aperture 38' is located. At the lower end of tube 21 an object lens 39 is mounted. The principal focus of lens 39 is at aperture 38'. Light rays from spot 35 (Fig. 5) of translucent map 23 are thus projected to form image 40, as an exact reproduction on relief map 41 of spot 35, as shown in perspective view in Fig. 5. By virtue of the prisms 36 and 37, and aperture 38' located at the principal focus of the objective, the optical system provides for telecentric projection only of those rectified light rays which are parallel to the optical axis of the system; the aperture 38' excludes all non-parallel rays. The visual image 40 on the relief map 41 is therefore a correct orthographic reproduction thereon, i. e. without distortion—of spot 35 of the translucent map. Image 40 therefore provides a ready means whereby an operator can sketch, in proper topographical relief, the details of the surface of the terrain upon the relief map. It will be understood that any system of erecting prisms and lenses in which light rays enter and leave the system in axial alignment, could be substituted for the Brashear-Hastings system.

The novel optical systems of my projection unit provides, for the first time, a means whereby the topography of a flat map can be reproduced as visual images upon a model of terrain in relief without displacement or distortion, and so that a permanent reproduction of the topography can be recorded on the relief model by a draftsman. It will be understood that it is my use of the Brashear-Hastings or similar erecting prisms which enables projection of a rectified image of the topography of the map upon the model, without offsetting of the image from the axis of projection; and that the axial alignment of the rays of the projected light beam locates each topographical detail at its exact position in nature irrespective of the elevation of the detail in nature or on the model.

Having thus illustrated and described the details of the preferred procedure and apparatus which may be used in the practice of my invention, it will, nevertheless be understood that I do not wish to limit myself to such details and claim as my invention any manner in which its principles may be usefully applied.

I claim:

1. In a device for producing topographical facsimiles on a reduced scale of portions of the earth's surface, in combination, a frame, an optical projection unit movably mounted in the frame, said unit including a source of light, a condensing lens, erecting prisms separated by an opaque plate having a light aperture therein, an objective lens having its principal focus located at said aperture a translucent planimetric facsimile of the terrain on a reduced scale mounted on a transparent support in said frame, means to move at will the condensing lens and light source above the facsimile and the erecting prisms and lens below it in constant alignment, and a relief model of the terrain upon the same reduced scale supported in said frame below said facsimile and in registering relationship therewith.

2. In a device for producing distortionless projections upon an uneven surface, in combination, a frame, an optical projection unit movably mounted on the frame, said unit comprising a source of light and an optical system for projecting parallel rays from the source of light upon an uneven surface, said source of light and said optical system being spaced apart, a transparent support for a design to be projected mounted in the space between said source of light and said optical system, movable arms carrying said source of light and said optical system movable in planes parallel to said transparent support, and a connection between the outer ends of said arms causing the arms to move as a unit, the mounting means for said arms permitting same to be moved so as to sweep over substantially the entire surface of said transparent support.

3. In a device for producing distortionless projections upon an uneven surface, in combination, a frame, an optical projection unit movably mounted on the frame, said unit comprising a source of light and an optical system for projecting parallel rays from the source of light upon an uneven surface, said source of light and said optical system being spaced apart, a transparent support for a design to be projected mounted in the space between said source of light and said optical system, movable arms carrying said source of light and said optical system movable in planes parallel to said transparent support, and a connection between the outer ends of said arms causing the arms to move as a unit, the mounting means for said arms permitting same to be moved so as to sweep over substantially the entire surface of said transparent support, said means for mounting the arms comprising a member mounted to rotate about an axis at right angles to the plane of said transparent support, said member having bores therethrough in which said arms are mounted to slide in longitudinal directions.

4. In a device for producing distortionless reproduction of a flat design upon an uneven surface, in combination, a frame, means for supporting a surface bearing a flat design upon said frame, means for illuminating portions of said surface, and an optical projection unit movably mounted on the frame for projecting an image of an illuminated portion of said flat surface upon an uneven surface in orthogonal projection, said unit including an optical system comprising a set of erecting prisms separated by an aperture plate having a small light aperture therein and an objective lens arranged to project a portion of the illuminated pattern on said flat surface by parallel rays upon said uneven surface, said objective lens having its principal focus coinciding with the aperture in said plate.

5. A device as claimed in claim 4 in which the optical system includes a pair of erecting prisms separated by a plate having a small light aperture therein and an objective lens having its principal focus coinciding with said light aperture.

HEREWARD LESTER COOKE.

REFERENCES CITED

The following references are of record in the file of this patent:

UNITED STATES PATENTS

| Number | Name | Date |
| --- | --- | --- |
| 1,199,942 | Taylor | Oct. 3, 1916 |
| 2,179,799 | Phillips | Nov. 14, 1939 |
| 2,200,594 | Diggins et al. | May 14, 1940 |
| 2,271,296 | Hargrave et al. | Jan. 27, 1942 |

FOREIGN PATENTS

| Number | Country | Date |
| --- | --- | --- |
| 9,863 | Great Britain | 1915 |